(12) United States Patent
Kamali et al.

(10) Patent No.: US 6,801,601 B2
(45) Date of Patent: *Oct. 5, 2004

(54) SINGLE ENDED LINE PROBING IN DSL SYSTEM USING TRANSFORMERLESS HYBRID

(75) Inventors: Jalil Kamali, San Jose, CA (US); Farrokh Rashid-Farrokhi, Pleasanton, CA (US)

(73) Assignee: Centillium Communications, Inc., Fremont, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 10/106,291

(22) Filed: Mar. 25, 2002

(65) Prior Publication Data

US 2002/0176490 A1 Nov. 28, 2002

Related U.S. Application Data

(63) Continuation-in-part of application No. 09/853,048, filed on May 9, 2001
(60) Provisional application No. 60/303,330, filed on Jul. 5, 2001.

(51) Int. Cl.[7] .......................... H04M 1/24; H04M 3/08; H04M 3/22
(52) U.S. Cl. ................. 379/1.04; 379/1.01; 379/1.03; 379/22.02; 379/24; 379/27.01
(58) Field of Search .................. 379/1.01, 1.03, 379/1.04, 3, 22, 22.01, 22.02, 22.03, 22.04, 22.08, 23, 24, 26.01, 27.01, 27.03, 29.01, 30, 31; 324/500, 525, 527, 534, 535

(56) References Cited

U.S. PATENT DOCUMENTS 4,105,995 A 8/1978 Bothof et al.
4,870,675 A 9/1989 Fuller et al.
5,083,086 A 1/1992 Steiner
5,128,619 A 7/1992 Bjork et al.
5,461,318 A 10/1995 Borchert et al.

(List continued on next page.)

FOREIGN PATENT DOCUMENTS

| CA | 2281208 A1 | 2/2001 |
| EP | 0 391 312 A2 | 10/1990 |
| EP | 1 014 658 A2 | 6/2000 |
| EP | 1 073 247 A2 | 1/2001 |
| EP | 1 081 924 A2 | 3/2001 |
| WO | WO 00/27134 | 5/2000 |
| WO | WO 01/01158 A1 | 1/2001 |
| WO | WO 01/24492 A1 | 4/2001 |

OTHER PUBLICATIONS

PCT Written Opinion, International Application No. PCT/US02/14470, Apr. 15, 2003, 6 pages.

PCT International Search Report, International Application No. PCT/US02/21000, Mar. 13, 2003, 5 pages.

(List continued on next page.)

*Primary Examiner*—Quoc Tran
(74) *Attorney, Agent, or Firm*—Fenwick & West LLP

(57) ABSTRACT

Single Ended Line Probing (SELP) techniques for devices having transformerless hybrid circuits are disclosed. These SELP techniques provide an accurate estimate of the length of a transmission medium (e.g., subscriber loop in Digital Subscriber Line (DSL) system) by computing a transfer function that accounts for the characteristics of the transformerless hybrid circuit and the transmission medium, and relating the transfer function to the length of the transmission medium at one or more frequencies.

24 Claims, 9 Drawing Sheets

U.S. PATENT DOCUMENTS

| | | | |
|---|---|---|---|
| 5,864,602 A | | 1/1999 | Needle |
| 5,881,130 A | | 3/1999 | Zhang |
| 6,002,671 A | | 12/1999 | Kahkoska et al. |
| 6,084,946 A | | 7/2000 | Beierle |
| 6,091,713 A | | 7/2000 | Lechleider et al. |
| 6,177,801 B1 | | 1/2001 | Chong |
| 6,215,855 B1 | | 4/2001 | Schneider ................ 379/22 |
| 6,256,377 B1 | | 7/2001 | Murphree et al. |
| 6,266,395 B1 | | 7/2001 | Liu et al. |
| 6,385,297 B2 | | 5/2002 | Faulkner et al. |
| 6,434,221 B1 | | 8/2002 | Chong |
| 6,456,694 B1 | * | 9/2002 | Posthuma ............... 379/1.04 |
| 6,466,649 B1 | | 10/2002 | Walance et al. |
| 6,487,276 B1 | | 11/2002 | Rosen et al. |
| 6,531,879 B1 | | 3/2003 | Nero, Jr. |
| 6,538,451 B1 | | 3/2003 | Gallie et al. |
| 6,658,051 B1 | * | 12/2003 | Liu ........................ 375/222 |
| 6,668,041 B2 | * | 12/2003 | Kamali et al. ........... 379/1.04 |
| 2003/0026391 A1 | * | 2/2003 | Kamali et al. .......... 379/27.01 |

OTHER PUBLICATIONS

PCT International Search Report, International Application No. PCT/US03/04614, May 16, 2003, 6 pages.

Baker et al., "Telephone Access Network Measurements," 1998, 81 pages.

Boets et al., "The Modelling Aspect of Transmission Line Networks," Proceedings of the Instrmentation and Measurement Technology Conference, New York, May 12–14, 1992, IEEE, pp. 137–141.

Ziemann, "ADSL Line Qualification Tests," Application Note 52, Wandel & Goltermann Communications Test Solutions, Sep. 28, 2000, pp. 1–5.

PCT International Search Report, International Application No. PCT/US02/21057, Nov. 14, 2002, 4 pages.

PCT International Search Report, International Application No. PCT/US02/14470, Aug. 29, 2002, 4 pages.

Hedlund et al., "DSL Loop Test," *Telephony*, Chicago, IL, vol. 235, No. 8, pp. 48–52, Aug. 24, 1998.

* cited by examiner

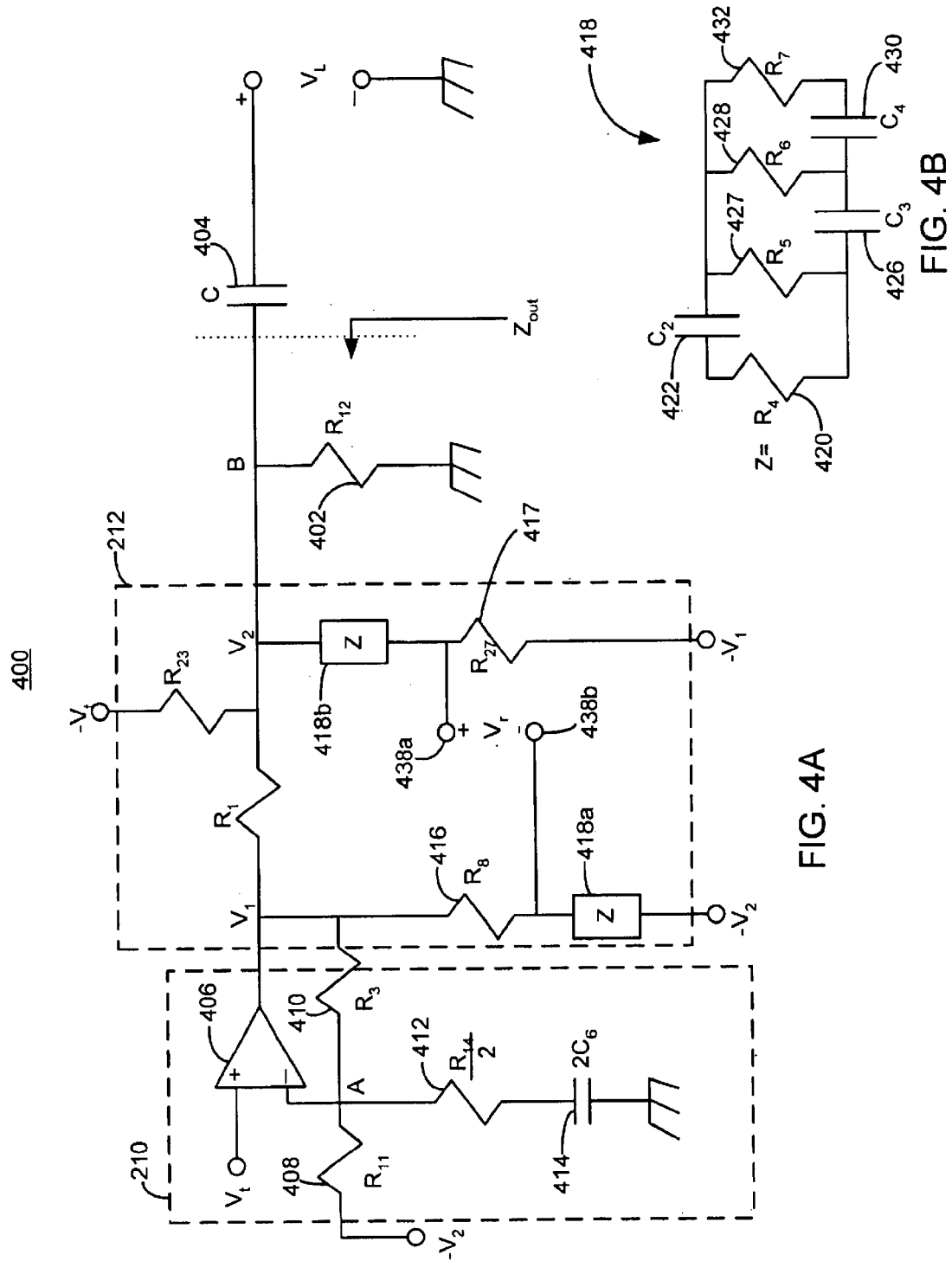

SINGLE ENDED LINE PROBING IN DSL SYSTEM USING TRANSFORMERLESS HYBRID

CROSS-REFERENCE TO RELATED APPLICATIONS

This application claims the benefit of U.S. Provisional Application No. 60/303,330, filed Jul. 5, 2001, and is a continuation-in-part of U.S. patent application Ser. No. 09/853,048, filed May 9, 2001, and is related to U.S. patent application No. 09/703,324, filed Oct. 31, 2000, which are all incorporated by reference herein in their entirety. This application is also related to U.S. patent application Ser. No. 10/115,503, filed Apr. 2, 2002.

BACKGROUND

1. Field of the Invention

The present invention is related to the field of telecommunications, and in particular, to single ended line probing (SELP) in a Digital Subscriber Line (DSL) system using a transformerless hybrid.

2. Background

DSL communications use copper telephone lines (e.g., twisted pair) for high-speed data transmission. A major problem for DSL service providers is to accurately qualify a subscriber's local loop (sometimes referred to as "probing the line") prior to the deployment of DSL service. In general, line probing involves measuring line parameters such as loop capacitance and loop resistance. A typical approach for probing the line requires a first handset to be attached to the telephone line at the telephone company's Central Office (CO) location and a second handset to be attached to the telephone line at the customer premises equipment (CPE) location. Thus, human interaction is required at two points of the telephone line, including a service call to the CPE location, which increases the cost of deployment. SELP techniques eliminate the need for a service call to the CPE location and the additional costs of such service.

Conventional SELP techniques use a resistor-capacitor (RC) circuit model to estimate the length of a transmission medium, as shown in FIG. 1A. The RC circuit model typically includes the known source resistance $R_s$ of the line and the unknown line capacitance $C_1$. The line capacitance is approximately proportional to the length L of the transmission medium. A Direct Current (DC) pulse is applied to the line and the charge-up time $t_c$ is monitored. This function is sometimes provided on a digital multimeter. Once the charge-up time is known (and given a value for $R_s$), the line capacitance $C_1$ can be estimated along with the line length. FIG. 1B is a graph illustrating the voltage across the line capacitance $C_1$ as a function of time.

Unfortunately, the probing technique described above cannot be employed in a typical CO DSL modem. This is because the resistance of the RC circuit model typically includes the source resistance $R_s$, but ignores the line resistance. This is a reasonable approximation of the resistance when the source resistance is much larger than the line resistance. In conventional DSL modem boards, however, the output resistance of the source is typically not significantly larger than the line resistance. As such, ignoring the line resistance degrades the accuracy of the loop length estimate. Moreover, such conventional line probing techniques fail to consider the characteristics of a DSL modem having a transformerless hybrid.

Accordingly, there is a need for a new SELP technique that is suitable for use with DSL modems having transformerless hybrid circuits, and that can provide an accurate estimate of subscriber loop length without requiring a service call to the CPE location.

SUMMARY

The present invention is directed to SELP techniques for devices (e.g., DSL modem) having transformerless hybrid circuits. These SELP techniques provide an accurate estimate of the length of a transmission medium (e.g., subscriber loop in a DSL system) by computing a transfer function that accounts for the characteristics of the transformerless hybrid circuit and the transmission medium. The transfer function is then related to the length of the transmission medium at one or more frequencies.

One embodiment of the present invention provides a method for estimating the length of a transmission medium included in a communication system having a transformerless hybrid circuit. The method includes transmitting a probe signal over the transmission medium by way of the transformerless hybrid circuit, and measuring a reflected version of the probe signal received from the transmission medium. The method proceeds with determining a transfer function characterizing the transmission medium and the transformerless hybrid circuit based on the transmitted probe signal and the reflected version of the probe signal, and estimating the length of the transmission medium based on the transfer function.

Another embodiment of the present invention provides a system for estimating the length of a transmission medium included in a communication system having a transformerless hybrid circuit. The system includes a transformerless hybrid circuit for transmitting a probe signal over the transmission medium. A processor is operatively coupled to the transformerless hybrid circuit (or included therein) for determining a transfer function characterizing the transmission medium and the transformerless hybrid circuit based on the transmitted probe signal and a reflected version of the probe signal received from the transmission medium. The processor estimates the length of the transmission medium based on the transfer function.

BRIEF DESCRIPTION OF THE DRAWINGS

These and other features, aspects, and advantages of the present invention will become better understood with regard to the following description, appended claims, and accompanying drawings where:

FIG. 4A is a circuit diagram of a transformerless hybrid circuit in accordance with one embodiment of the present invention;

FIG. 4B is a circuit diagram of an impedance circuit for use in the hybrid circuit shown in FIG. 4A;

DETAILED DESCRIPTION OF EMBODIMENTS

Transformerless SELP Device

Figure 2:
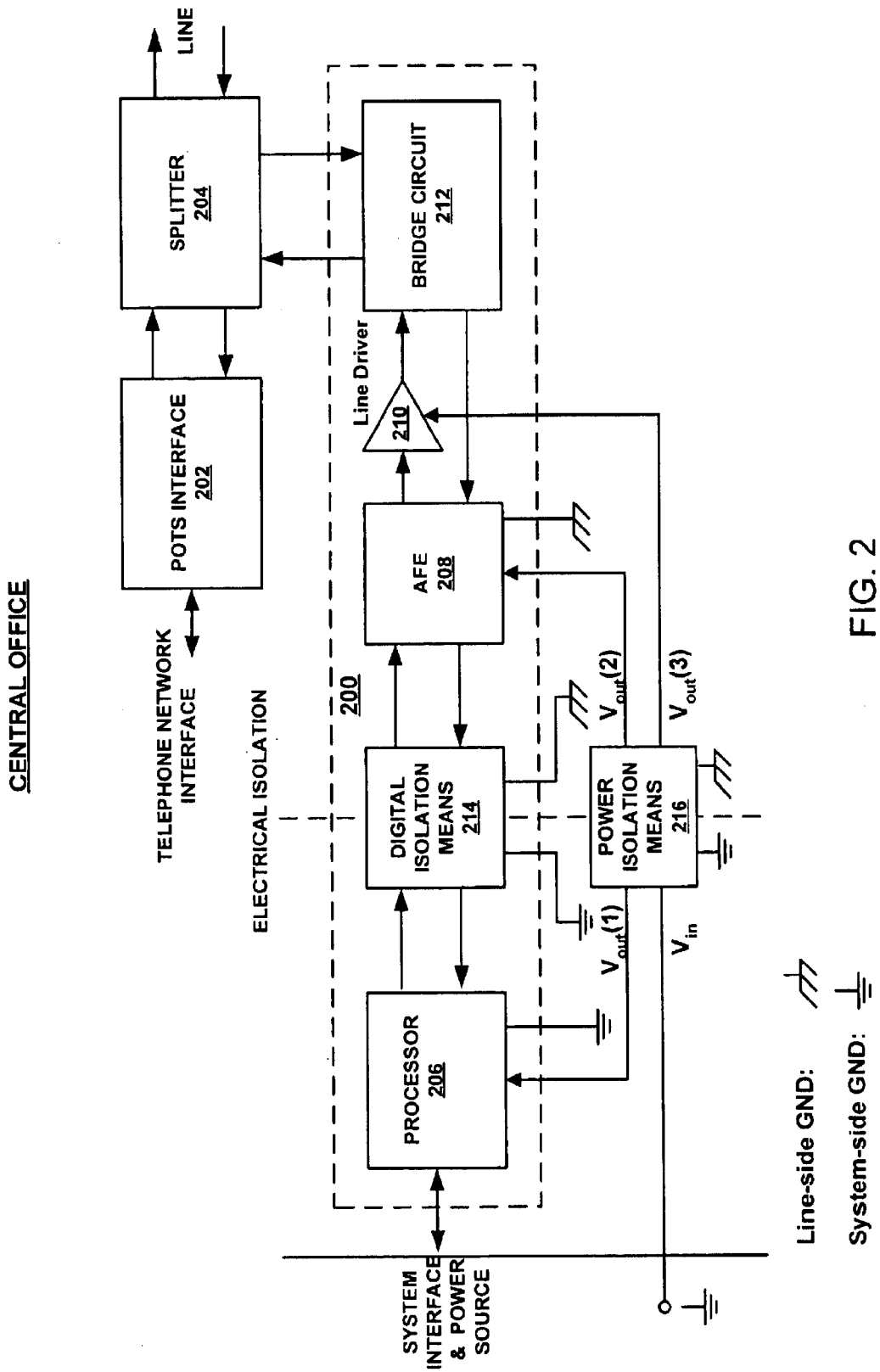
FIG. 2 is a block diagram of a transformerless SELP device in accordance with one embodiment of the present invention.

Referring to FIG. 2, there is shown a block diagram of a transformerless SELP device 200 (hereinafter also referred to as "modem 200") in accordance with one embodiment of the present invention. The modem 200 generally includes processor 206, analog front end (AFE) 208, transmitter/line driver circuit 210 (hereinafter referred to as line driver 210), bridge circuit 212, digital isolation means 214 and power isolation means 216. Absent from modem 200 is a line isolation transformer, typically used in conventional DSL modems.

The modem 200 can also include other components and features (e.g., filters and other conventional modem modules), which have been omitted from FIG. 2 to avoid obscuring the present invention. Modem 200 can be one of a plurality of DSL modems included on a multiple port assembly (e.g., a line card having 48 individual modems and corresponding ports). Alternatively, modem 200 can be a stand-alone DSL modem or other SELP device, for determining the length of the transmission medium. In the embodiment shown, modem 200 is deployed in a central office, and is operatively coupled to the tip and ring (or other suitable transmission medium) by way of a splitter 204. Splitter 204 is also coupled with POTS interface 202.

In the upstream direction (e.g., signals entering the CO), incoming analog signals received from the transmission line are split into high and low frequency analog signals by splitter 204, using known filtering techniques. The low frequency Plain Old Telephone Service (POTS) signals are sent to the POTS interface 202, which processes the signals for transmission over a telephone network. The high frequency data signals (e.g., DSL data) are sent to the modem 200, where they enter the bridge circuit 212, which performs 2-to-4-wire conversion (e.g., two-wire phone line to a transmit pair and receive pair). The data signals are then received by the AFE 208, which typically includes an analog-to-digital (A/D) converter and a digital-to-analog (D/A) converter. The AFE 208 can also include a Programmable Gain Amplifier (PGA) for adjusting the level of the data signals. The analog data signals received by the AFE 208 are converted to digital form by the A/ID converter and provided to processor 206 via the digital isolation means 214.

The processor 206 is programmed or otherwise configured to affect the principles of the present invention, which is described more fully below. For example, processor 206 is configured to generate control signals for activating switching mechanisms (e.g., switches in FIG. 3) when operating in SELP mode. Additionally, processor 206 is adapted to transmit probe signals and measure the reflected versions of such probe signals so that characteristics of the transmission line (e.g., transfer function) can be determined. Processor 206 may be further adapted to perform other functions, such as scrambling/descrambling, encoding/decoding, error checking, modulation/demodulation and other programmable modem functions (e.g., FFT/DFT algorithms). In one embodiment, processor 206 is a Digital Signal Processor (DSP), but other suitable processing environments can be employed here as well (e.g., microcontroller or microprocessor).

In the downstream direction (e.g., signals leaving the CO), data signals are received by processor 206, for example, from a system interface. Such data signals might originate from a high-speed data network or from another CO located somewhere on the Public Switched Telephone Network (PSTN). The digital output of processor 206 is converted to its analog equivalent by the D/A converter in the AFE 208. The output of AFE 208 is provided to the line driver 210, which is coupled to bridge circuit 212. The bridge circuit 212 performs a 4-to-2-wire conversion on the data signals before they are transmitted to the transmission line via splitter 204. Outgoing POTS signals from POTS interface 202 and outgoing high frequency data signals from modem 200 are combined in the splitter 204 and transmitted over the transmission line.

The modem 200 includes digital isolation means 214 and power isolation means 216 to provide isolation in the absence of a line transformer. A conceptual line of electrical isolation (vertical dashed line in FIG. 2) separates the line side ground from the system side ground and includes the digital isolation means 214 and the power isolation means 216. The digital isolation means 214 electrically isolates the AFE 208 from the processor 206. As such, digital duplex data can be transmitted between the AFE 208 and the processor 206, but the ground plane associated with the AFE 208 is isolated from the ground plane associated with the processor 206. Thus, in the event that the digital data paths are subjected to a system side failure mode (e.g., a short-circuit in the communication system interface or back plane), that failure mode will be prevented from propagating to the transmission line. Likewise, a line-side failure will be prevented from propagating to the system-side.

The power isolation means 216, on the other hand, isolates the power source, in, from the power outputs $V_{out}$ (1), $V_{out}$ (2) and $V_{out}$ (3). Each of these power outputs can operate independently of each other. In the event of a power problem (e.g., assume that the line driver 210 malfunctions thereby short-circuiting $V_{out}$ (3)), Vin will be protected from the short circuit. Likewise, the remaining power outputs (e.g., $V_{out}$ (1) and $V_{out}$ (2)) will be protected from the short circuit. Such power isolation allows the modem 200 to be powered by a system-side power source that is referenced to a system-side ground plane (system-side GND). However, that system-side ground plane is isolated from the line-side ground plane (line-side GND). As such, variations in the line-side ground plane will not be intermingled with the system-side ground plane, and undesirable fluctuations in $V_{in}$, are prevented.

By providing the line of electrical isolation as both a digital isolation means and a power isolation means, the relevant industry regulatory standards are satisfied, the undesirable DSL coupling transformer is eliminated, and the modem 200 is fully powered from a system-side power source. Various embodiments of digital isolation means and power isolation means are discussed in more detail in U.S. patent application Ser. No. 09/703,324, entitled "ELECTRICAL ISOLATION TECHNIQUES FOR DSL SYSTEM."

Embodiment Including Splitter

Figure 3:
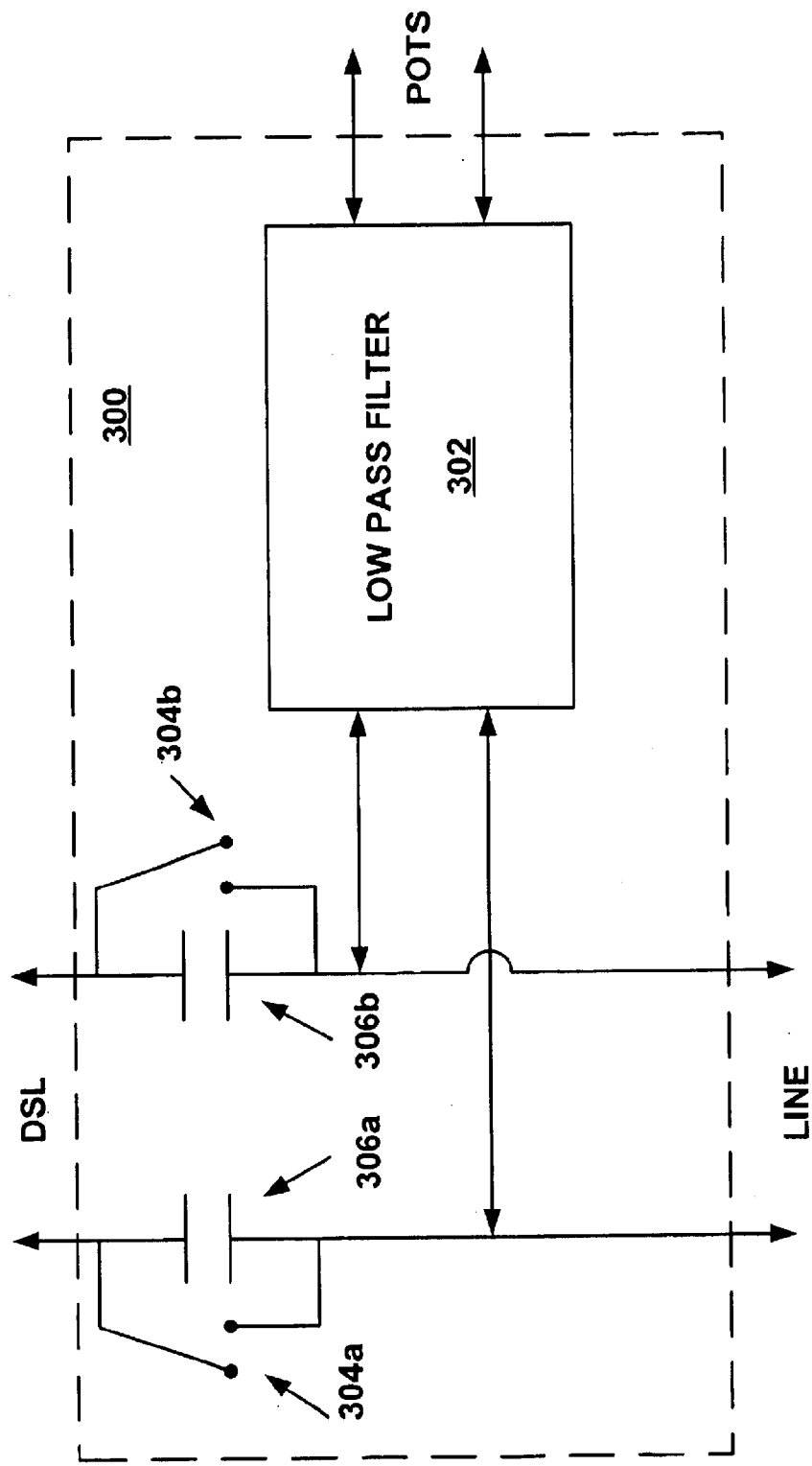
FIG. 3 is a block diagram of splitter device in accordance with one embodiment of the present invention.

Referring to FIG. 3, there is shown a block diagram of a splitter 300 for optional use with the modem 200 in accordance with one embodiment of the present invention. Splitters are typically coupled between CO DSL modems and telephone lines to split incoming high-frequency DSL data signals from incoming low-frequency POTS signals. To allow low frequency probe signals transmitted by the DSL modem access to the transmission medium, the splitter must be bypassed or otherwise removed from the communication path. The splitter 300 can be a stand-alone device or integrated into modem 200.

In one embodiment of the present invention, the splitter 300 includes low pass filter 302, bypass switches 304a–b and DC coupling capacitors 306a–b. The DC coupling capacitors 306a–b, serially coupled between the line and the modem 200, block low frequency signals from entering the modem 200 during normal operation. During SELP mode, the bypass switches 304a–b are closed, thereby removing the DC coupling capacitors 306a–b from the signal path. As such, low frequency probe signals are allowed to access the transmission line. The switches 306a–b are controlled by a control signal that is activated when SELP mode is entered. The control signal can be triggered, for example, in response to receiving and decoding a SELP mode enable/request signal transmitted by a remote modem (e.g., pilot tone designated as SELP mode enable/request signal). Alternatively, the control signal can be provided by or otherwise triggered by a local processor (e.g., processor 206) in response to receiving a request to enter SELP mode. The request may come from, for example, the local network operator or management entity. Alternatively, the request may be self-initiated by modem 200 in response to detecting a particular condition, such as a repeated link failure in data mode. In the embodiment described above, the DC coupling capacitors 306a–b are included in splitter 300. However, the DC coupling capacitors can also be part of a hybrid circuit 400, described below with respect to FIG. 4A.

The modem 200 described above can be used to estimate the length of a transmission medium, which length can be estimated using a transfer function that models the characteristics of the modem 200 and the transmission medium, as described below with reference to FIGS. 4A and 4B.

Hybrid Circuit

Referring to FIG. 4A, there is shown a circuit diagram of a transformerless hybrid circuit (hereinafter "hybrid circuit 400") in accordance with one embodiment of the present invention. FIG. 4B shows a diagram of an impedance circuit used in the transformerless hybrid circuit shown in FIG. 4A. Only half of the hybrid circuit 400 is shown in FIG. 4A to simplify discussion. Those skilled in the art will understand that the other half of the hybrid circuit 400 is a mirror image of the circuit shown, and that the high-pass filter components (e.g., $2C_6$, $R_{14}/2$) have been adjusted appropriately to account for the other half circuit. Those skilled in the art will also understand that the hybrid circuit 400 illustrates one of many such configurations, and the configuration shown is not intended to limit the scope of the present invention in any way. For example, various other components that are not illustrated in the figures herein might be included in SELP device configurations (e.g., additional capacitors, amplifiers, resistors, etc.). Similarly, components that are illustrated in the figures herein might not be included in other SELP device configurations. The voltages $V_t$ and $V_r$ are the transmit and receive voltages, respectively. The voltage $V_2$ is the output voltage of the hybrid circuit 400 when the transmission line is not connected (open loop voltage) and $V_L$ is the output voltage of the hybrid circuit 400 when the transmission line is connected (closed loop voltage).

The hybrid circuit 400 comprises line driver 210, bridge circuit 212, load resistor 402 ($R_{12}$) and series capacitor 404 (C). The line driver 210 further comprises amplifier 406, bias resistor 408 ($R_{11}$), feedback resistor 410 ($R_3$), filter resistor 412 ($R_{14}$) and filter capacitor 414 ($C_6$). The values of bias resistor 408 and feedback resistor 410 are selected to provide a desired output gain for the amplifier 406. The filter resistor 412 and filter capacitor 414 comprise a high-pass filter. The values of filter resistor 412 and filter capacitor 414 are selected to provide a desired corner frequency for the high-pass filter.

The bridge circuit 212 further comprises resistors 416 ($R_8$), 417 ($R_{27}$) and impedances 418a–b (Z). The bridge circuit 212 provides 2–4 wire conversion and impedance matching between the internal circuitry of the hybrid circuit 400 and the transmission lines. Impedances 418a–b can comprise various combinations of active and passive elements having values, which are selected to provide such impedance matching. FIG. 4B shows one embodiment of the impedances 418a–b comprising resistors 420, 424, 428 and 432 and capacitors 422, 426 and 430.

Operation of Hybrid Circuit

The hybrid circuit 400 is capable of running in at least two modes of operation: normal operation and SELP mode. In normal operation, the modem 200 transmits and receives high frequency DSL data signals to and from a transmission medium (e.g., copper twisted pair), while blocking low frequency signal access to the transmission medium. In SELP mode, the modem transmits one or more low frequency probe signals (e.g., DC to 10 KHz) to the transmission medium to estimate its loop length. Thus, the hybrid circuit 400 can accommodate both high frequency and low frequency signals at different times depending on the mode of operation.

Loop Length Estimation

In accordance with the present invention, measurements of the closed-loop line voltage $V_L$ can be used to estimate the length of a transmission medium (e.g., a subscriber loop in a xDSL system). Applying Kirchhoff's voltage law (KVL) at nodes A and B in the hybrid circuit 400 leads to the following system of equations:

$$\frac{V_t + V_2}{R_{11}} + \frac{V_t}{R_{14} + \frac{1}{2sC_6}} + \frac{V_t - V_1}{R_3} = 0 \quad (1)$$

$$\frac{V_2 - V_1}{R_1} + \frac{V_2 + V_1}{Z + R_{27}} + \frac{V_2}{R_{12}} + \frac{V_2 + V_t}{R_{23}} = 0 \quad (2)$$

The transfer function from $V_t$ to $V_2$ (e.g., $V_2=H(s)V_t$) when no load is connected, can be calculated by solving equations (1) and (2).

Figure 5A:
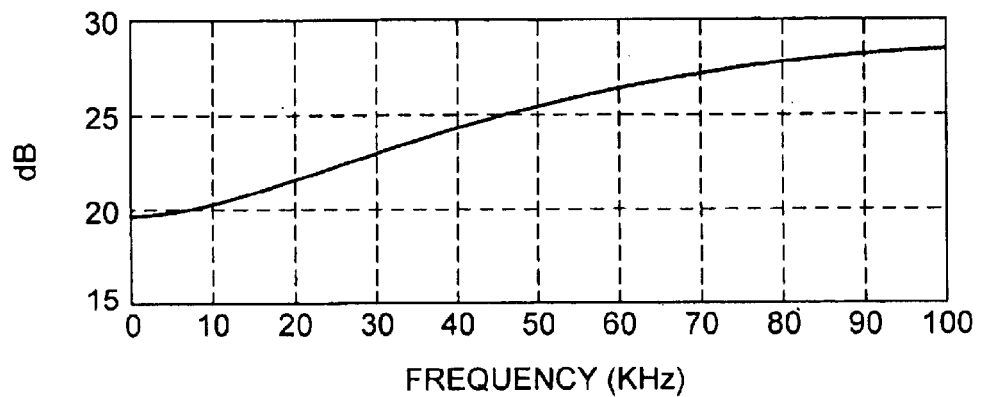
FIG. 5A is a graph of the absolute value of the transfer function $V_L/V_2$ derived from the hybrid circuit shown in FIG. 4A.
Figure 5B:
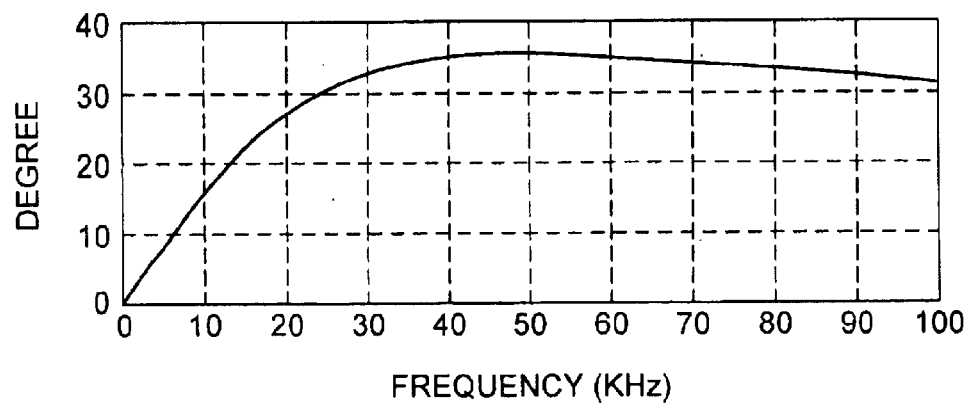
FIG. 5B is a graph of the phase of the transfer function $V_L/V_2$ derived from the hybrid circuit shown in FIG. 4B.

FIGS. 5A and 5B are graphs showing the magnitude and the phase of the open load transfer function $H(s)=V_2/V_t$. It is clear form FIG. 5A that the hybrid circuit 400 behaves like a high pass filter, but still has enough power in the voice band to perform SELP operations using low frequency probe signals.

To find the output impedance $Z_{out}$ of the hybrid circuit 400, the transmit voltage $V_t=0$ and a current source I is connected to node B. The KVL equations then have the following form:

$$\frac{V_2}{R_{11}} - \frac{V_1}{R_3} = 0 \qquad (3)$$

$$\frac{V_2 - V_1}{R_1} + \frac{V_2 + V_1}{Z + R_{27}} + \frac{V_2}{R_{12}} + \frac{V_2}{R_{23}} = I \qquad (4)$$

where the output impedance $Z_{out}$ is:

$$Z_{out} = \frac{V_2}{I} \qquad (5)$$

Figure 6A:
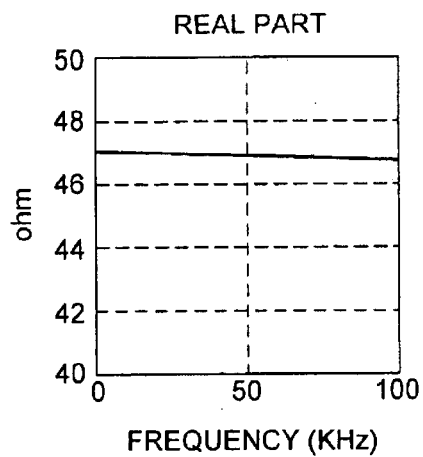
FIGS. 6A–6C are graphs of the real, imaginary and absolute values, respectively, of the output impedance $Z_{out}$ for the hybrid circuit shown in FIG. 4A.
Figure 6B:
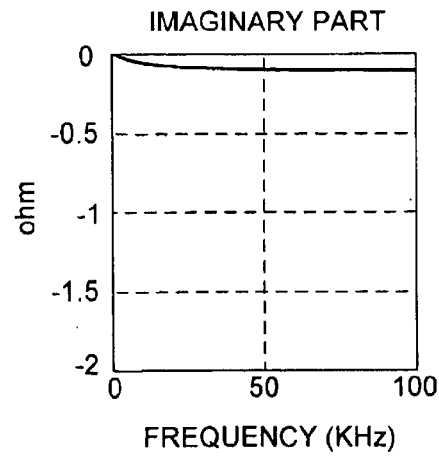
Figure 6C:
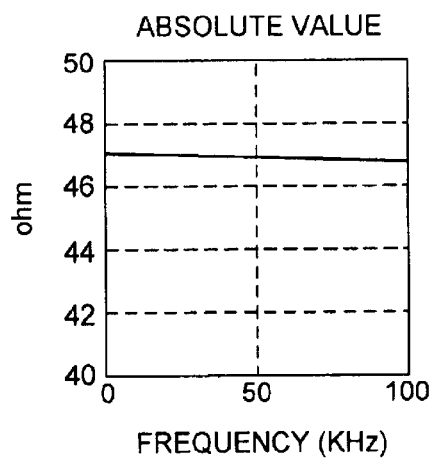
Figure 7:
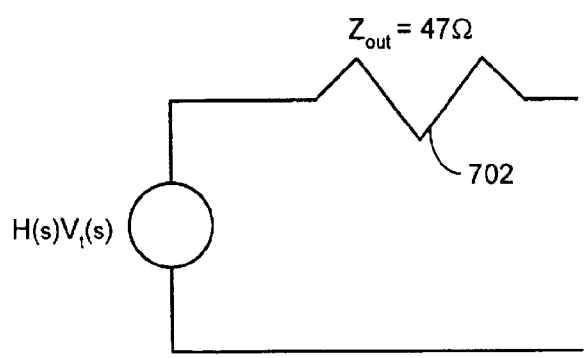
FIG. 7 is circuit diagram of a Thevenin equivalent circuit for the hybrid circuit shown in FIG. 4A.

FIGS. 6A–6C are graphs of $Z_{out}$, which is the output impedance of the hybrid circuit 400 shown in FIG. 4A. $Z_{out}$ can be represented mathematically as $Z_{out}$=X+jY, where X is a real number and Y is an imaginary number. FIG. 6A illustrates the real portion of $Z_{out}$. FIG. 6B illustrates the imaginary portion of $Z_{out}$. FIG. 6C illustrates the absolute value of $Z_{out}$, which is determined as follows $|Z_{out}|$= $\sqrt{X^2+Y^2}$. As can be observed from FIG. 6C, a 47-ohm resistor accurately models the output impedance $Z_{out}$. Therefore, the Thevenin equivalent circuit for the hybrid circuit 400 includes a 47-ohm equivalent resistor 702, as shown in FIG. 7.

The output impedance $Z_{out}$ computed above is specific to the one particular embodiment of the present invention. Generally, the value of $Z_{out}$ depends upon the number and types of passive and active components in the hybrid circuit. Other embodiments of transformerless hybrid circuits could have different output impedances, and the methods disclosed in this specification are applicable to those embodiments as well.

Figure 1A:
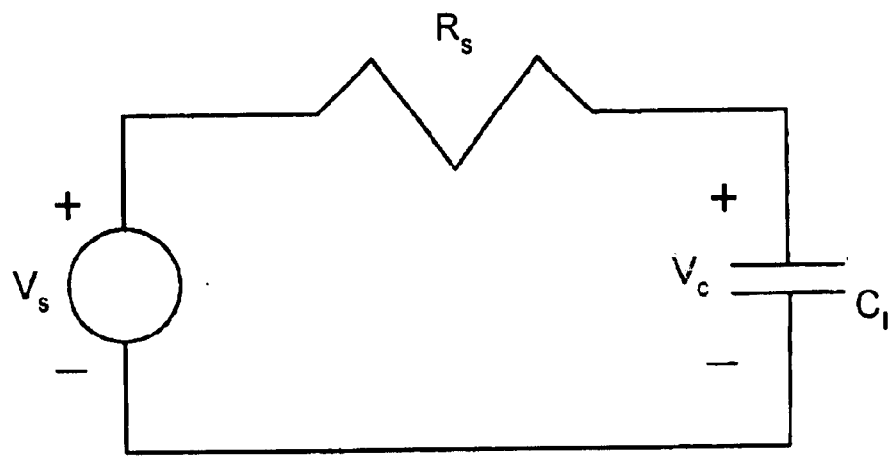
FIG. 1A is a circuit diagram of a prior art RC circuit model.
Figure 1B:
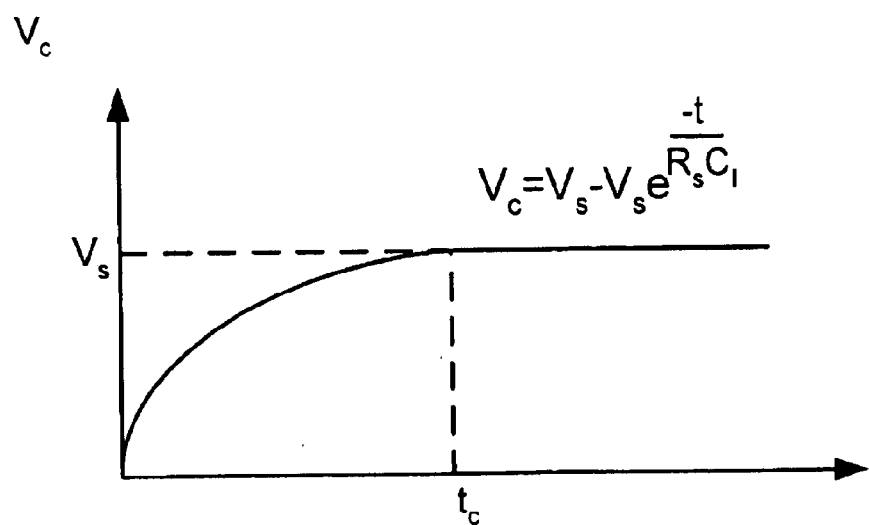
FIG. 1B is a graph showing the step voltage response of the RC circuit model in FIG. 1A.
Figure 8:
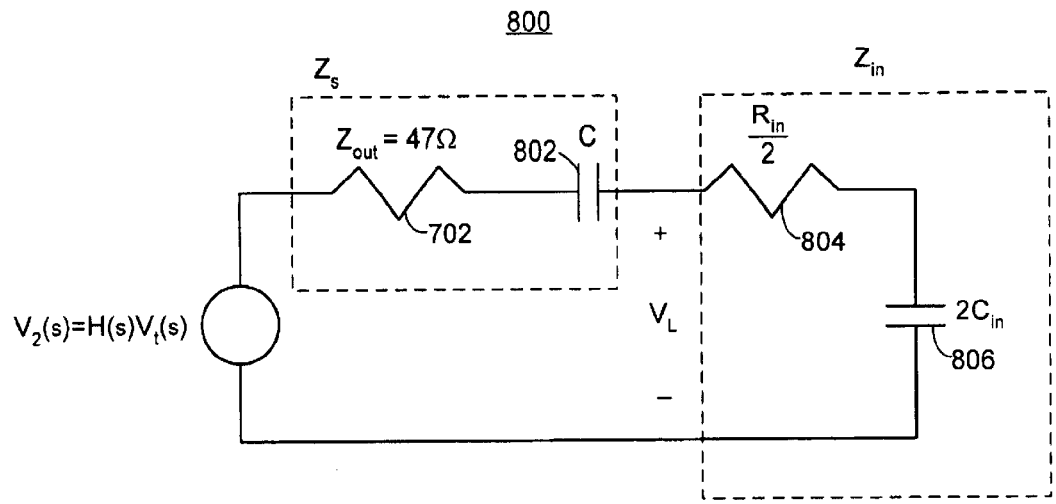
FIG. 8 is a circuit diagram of a Thevenin equivalent circuit for the hybrid circuit shown in FIG. 4A coupled to an RC model of the transmission medium.

Referring to FIG. 8, there is shown a circuit diagram of the Thevenin equivalent circuit 800 for half of the hybrid circuit 400, coupled to the transmission medium. The equivalent circuit 800 results from connecting the equivalent circuit 700 shown in FIG. 7, with the low frequency RC circuit shown in FIG. 1. In one particular embodiment, circuit 800 includes equivalent output resistor 702, series capacitor 802 (C), line input resistor 804 ($R_{in}$) and line capacitor 806 ($C_{in}$). The series capacitor 802 provides similar functionality as the DC decoupling capacitors 306a–b in the hybrid circuit 400, and has a value of 150 nF. The line input resistor 804 and the line capacitor 806 are halved and doubled, respectively, to account for the other half of hybrid circuit 400.

Figure 9:
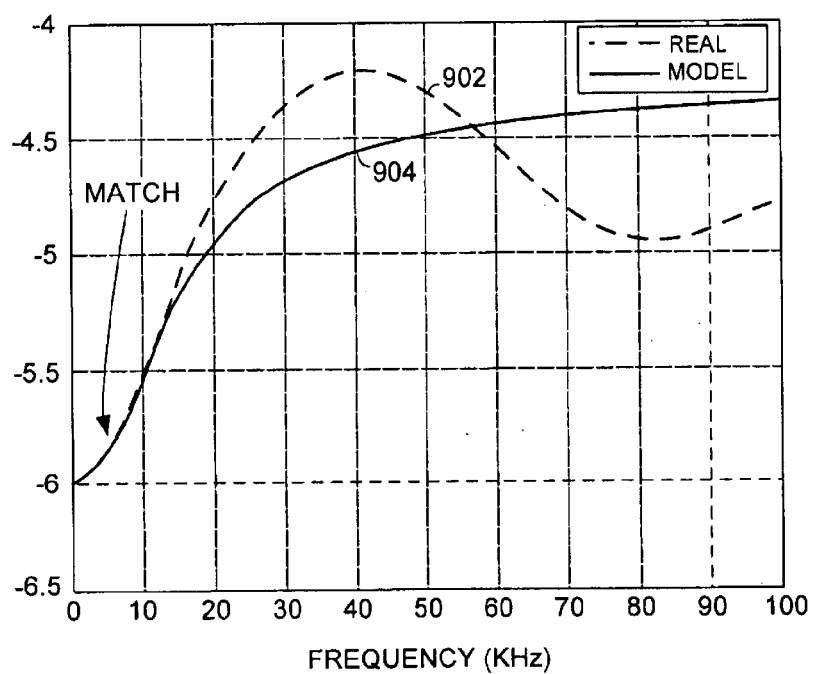
FIG. 9 is a graph showing the absolute value of a transfer function for the hybrid circuit shown in FIG. 4A and a computer model for same.

Referring to FIG. 9, there is shown the absolute value of a transfer function for the hybrid circuit 400 of a 5 Kft, 26 American Wire Gauge (AWG) loop obtained from equivalent circuit 800. Two curves are shown in FIG. 9. A first curve 904 (hereinafter also referred to as the "Model" curve) is based on a simple RC model of the loop, as used in the equivalent circuit 800 shown in FIG. 8. A second curve 902 (hereinafter also referred to as the "Real" curve) is based on a more sophisticated computer model of the loop. $V_2$ is the open loop voltage at the output node (see FIG. 4A) when the loop is not connected to the hybrid circuit 400 and $V_L$ is the voltage at the same node when the loop is connected to the hybrid circuit 400.

As shown in FIG. 9, the "Model" curve 904 closely matches the "Real" curve 902 at low frequencies (e.g., DC up to about 10 KHz), which is expected because the RC circuit model is inherently a low frequency model. Since the line input resistance 804 and the line capacitance 806 in equivalent circuit 800 are directly related to the loop length, the loop length can be theoretically related to the absolute value of the transfer function $V_L/V_2$ at a particular frequency (e.g., 1 KHz) within a particular frequency range (e.g., DC to 10 KHz). The theoretical relationship between the transfer function $V_L/V_2$ and loop length L can be derived from the equivalent circuit 800 as follows:

$$\frac{V_L}{V_2} = \frac{Z_{in}}{Z_{in} + Z_s} \qquad (6)$$

$$Z_s = Z_{out} + \frac{1}{Cs} \qquad (7)$$

$$Z_{in} = \frac{1}{2}\left(R_{in} + \frac{1}{C_{in}s}\right) \qquad (8)$$

$$R_{in} = \frac{r_{oc}}{3}L \qquad (9)$$

$$C_{in} = c_\infty L \qquad (10)$$

where, $r_{oc}$ and $c_\infty$ are known cable parameters and C is the series capacitor shown in FIG. 4A (e.g., 0.15 μF). For example, for a 26 American Wire Gauge (AWG) line, $r_{oc}$=286.18 Ω/Km and $c_\infty$=49 nF/Km. The values $r_{oc}$ and $c_\infty$ can be stored in a look-up table in computer-readable medium (e.g., EEPROM or flash memory) accessible by a processor (e.g., processor 206). Since the constants $r_{oc}$ and $c_\infty$ do not change significantly from one wire-type to another, average values among different wire-types for each of the constants $r_{oc}$ and $c_\infty$ can be used without degrading the accuracy of the measurement. Equations 6 through 10 can be solved for the loop length L. Each value of the transfer function $V_L/V_2$ as it transitions over a given frequency range can be associated with a corresponding loop length L. As such, a look-up table or other data structure that provides transfer function value-loop length pairs at particular probe frequencies can be developed. The values for $V_L/V_2$ for different loop lengths L can be normalized before being stored in the look-up table or other data structure. Once the absolute value of $V_L/V_2$ is determined, the look-up table can be consulted to identify the corresponding loop length L. In an alternative embodiment, the values of L can be determined on-the-fly using equations 6–10 and stored values for $r_{oc}$ and $c_\infty$.

Figure 10:
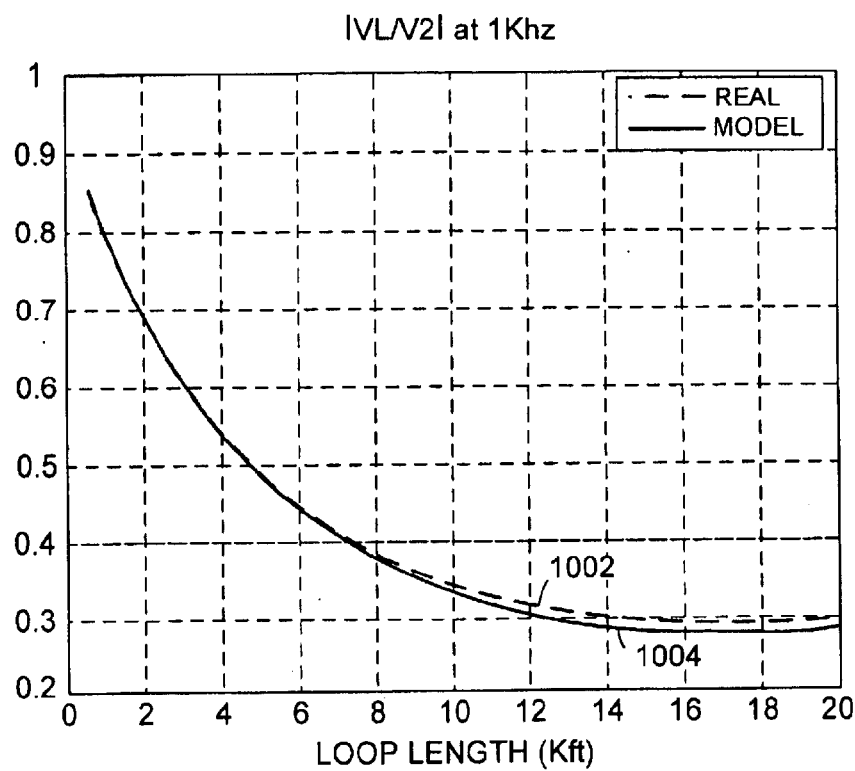
FIG. 10 is a graph showing the absolute value of a transfer function derived from the hybrid circuit shown in FIG. 4A versus loop length.

Referring to FIG. 10, there is shown a graph of the absolute value of the transfer function $V_L/V_2$ versus loop length L at a probe signal frequency of 1 KHz. Both "Model" and "Real" curves are shown in FIG. 10. The "Model" curve 1004 closely matches the "Real" curve 1002 for a probe signal frequency of 1 KHz. As FIG. 10 shows, an accurate loop length L can be made at about 1 KHz for loop lengths up to about 15 Kft. Lower probe signal frequencies (e.g., 500 Hz) can be used for longer loops (e.g., 20 Kft).

Note that the probe signal frequency range that can be used to estimate loop length varies with the configuration of the transformerless hybrid. Thus, other hybrid configurations can be implemented to allow, for example, higher frequency probe signals that do not provide a steady state transfer function value.

Figure 11:
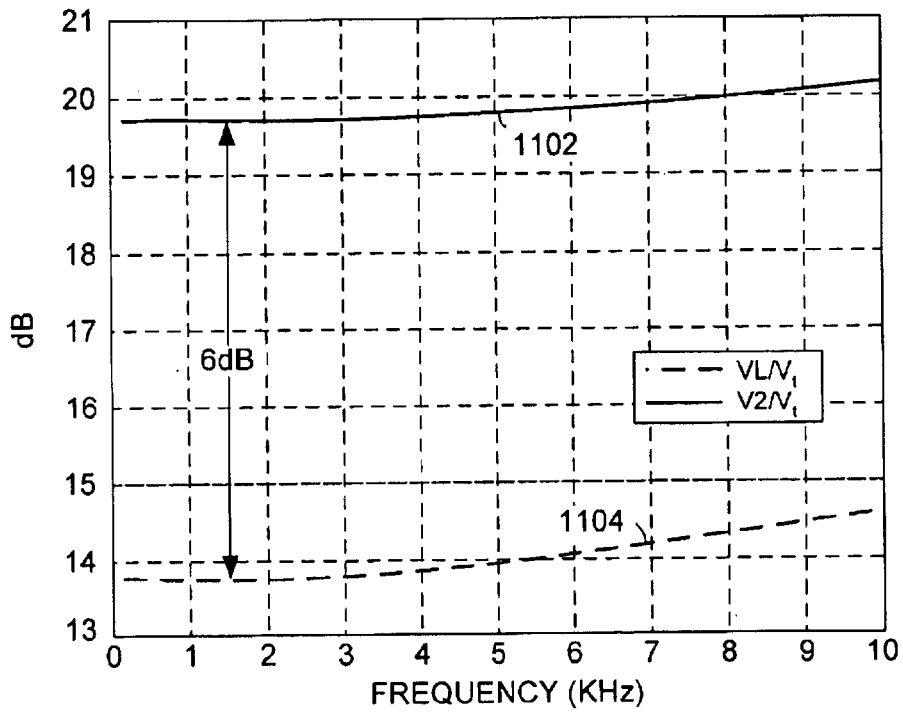
FIG. 11 is a graph of $V_L/V_t$ and $V_2/V_t$ transfer functions determined in accordance with one embodiment of the present invention.

Referring to FIG. 11, there is shown a graph of $V_L/V_t$ (designated as 1104) and $V_2/V_t$ (designated as 1102) transfer functions at low frequencies (DC to 10 KHz) for a 5 Kft, 26 AWG loop in accordance with one embodiment of the present invention. $V_2$ is the open loop voltage at node B and $V_t$ is the transmit voltage. As FIG. 11 shows, at 1 KHz both transfer functions have sufficient magnitude and their difference is about 6 dB, which translates to about two bits of resolution in the analog-to-digital converter (A/D). Thus, the same Programmable Gain Amplifier (PGA) settings can be used to measure both the voltages ($V_L$ and $V_2$), without having to adjust between measurements.

Figure 12:
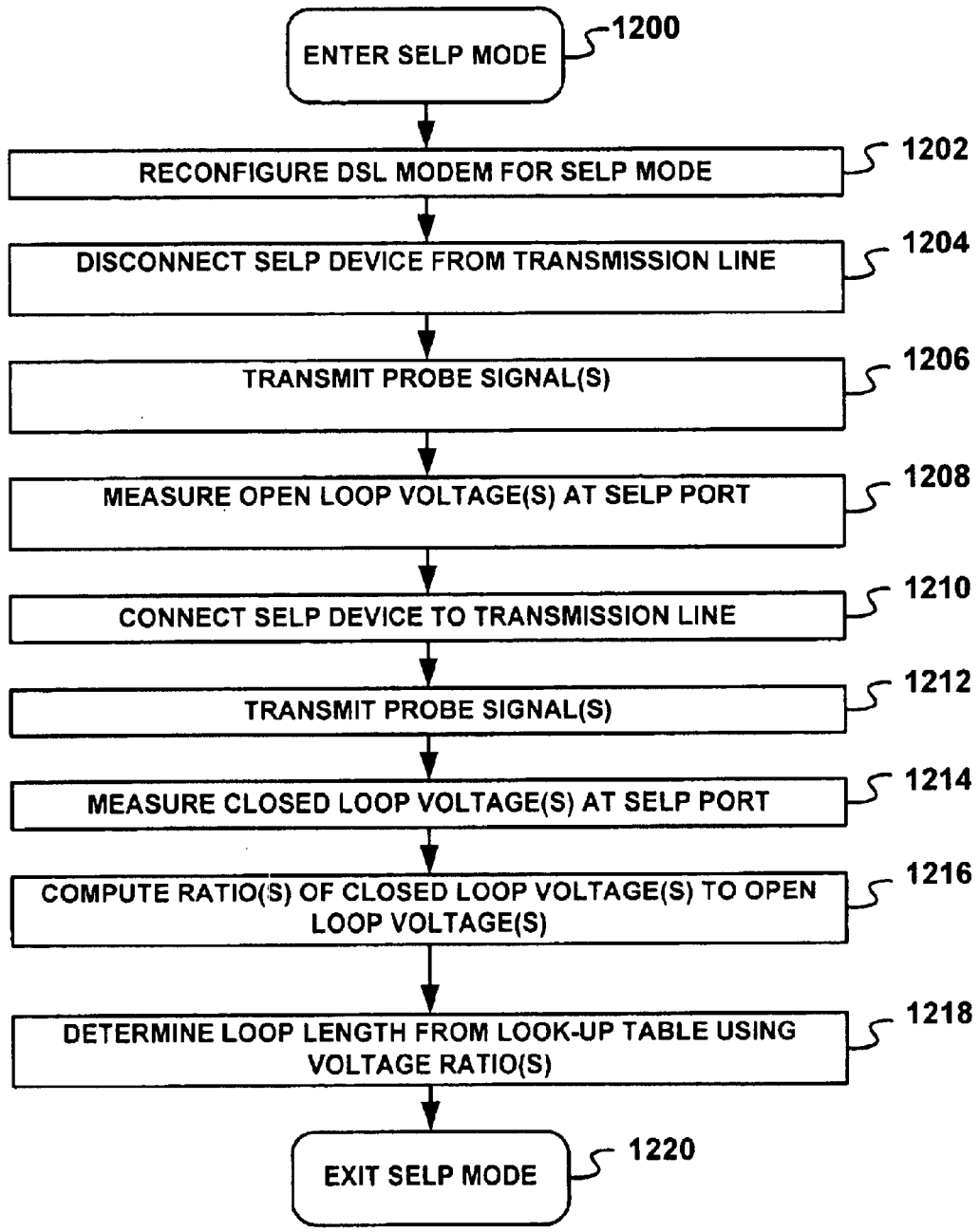
FIG. 12 is a flow diagram of a SELP method of estimating the length of a transmission medium in accordance with one embodiment of the present invention.

Referring to FIG. 12, there is shown a SELP method of estimating loop length in accordance with one embodiment of the present invention. The method can be carried out, for example, by a transformerless DSL modem (e.g., modem 200) located at the CO and configured as described in reference to FIGS. 2, 3 and 4. The method begins when the SELP device enters 1200 a SELP mode in response to a request, for example, by a system operator located at the CO or an application running on a host computer at a remote site. This could occur during DSL service qualification on either an individual or bulk basis. Alternatively, the SELP device can be programmed to automatically run SELP mode during, for example, an initialization phase.

After starting 1200 the SELP mode, the SELP device is reconfigured 1202, to allow a line probe signal having a predetermined frequency (e.g., 1 KHz) access to the transmission line. Alternatively, a sequence of line probe signals can be transmitted over the transmission medium by sweeping the frequency of a transmit signal in a desired frequency range (e.g., 1 Hz to 10 KHz). If a splitter (e.g., splitter 300) is included in the system, then bypass switches 304a–b are closed to allow low frequency probe signals to access the line.

After reconfiguring 1202 the SELP device, the SELP device, optionally, disconnects 1204 itself from the transmission medium and transmits 1206 the line probe signal(s) in open loop. The transmission medium can be disconnected 1204 from the transmission medium using one or more software or hardware switches or equivalent devices. In one embodiment, samples of the transmitted line probe signals are kept in a storage device (e.g., EEPROM or other memory device) accessible by a processor (e.g., processor 206) located in or coupled to a SELP device. Upon receiving a request to initiate a line probing sequence, the processor accesses the samples from the storage device, which can then be converted to analog form and driven (e.g., via line driver 210) onto the transmission medium. Alternatively, a processor triggers a signal generator, providing the line probe signals. If more than one frequency is used, the frequency step size of the line probe signals is selected to achieve a predetermined accuracy (e.g., 100 Hz steps). In one embodiment, the type of waveform used for the line probe signals is sinusoidal, but any waveform can be used, including but not limited to, square waves, triangular waves and any combination of such waveforms. The open loop output voltage at the SELP port (e.g., open loop voltage $V_2$ at node B in FIG. 4A) is measured 1208 for each transmitted probe signal. After measuring the open loop voltage at one or more frequencies, the loop is reconnected 1210 to the transmission medium, and the line probe signals are transmitted 1212 again. Each transmitted line probe signal travels the length of the transmission line and is reflected back to the SELP port. For each transmitted line probe signal, the closed loop output voltage at the SELP port (e.g., closed loop voltage $V_L$ at node B in FIG. 4A) is converted into digital form (e.g., by AFE 208) and measured 1214 (e.g., by processor 206).

Alternatively, the open loop voltage ratios can be determined theoretically and stored in local memory or at a remote location, thereby eliminating the need for the SELP device to perform steps 1204–1210.

A transfer function for the hybrid circuit coupled to the line (e.g., $V_L/V_2$) is computed 1216 by dividing the closed loop voltage determined in step 1214 by the open loop voltage determined in step 1208. The resulting ratio can then be used to, for example, to index or otherwise access a look-up table or other data structure and determine 1218 the corresponding length of the transmission medium. If multiple samples of the transfer function $V_L/V_2$ are collected over a frequency range, then the average value or other statistical measurement of those samples can be used to access the look-up table. For example, the Mean Squared Error (MSE) between the measured values for the transfer function $V_L/V_2$ and the look-up table values for $V_L/V_2$ can be determined, and the loop length corresponding to the pair of transfer function $V_L/V_2$ values having the lowest MSE can be selected as an estimate of the loop length. A similar technique for output impedances is described in detail in co-pending patent application Ser. No. 09/853,048, entitled "SINGLE ENDED LINE PROBING IN DSL SYSTEM." Those with ordinary skill in the art would understand how to adapt those techniques to determine the MSE between the measured values for the transfer function $V_L/V_2$ and the look-up table values for $V_L/V_2$.

In one embodiment of the present invention, a look-up table or other data structure comprises values for the transfer function $V_L/V_2$ and the corresponding loop lengths for a given frequency, as shown in FIG. 10. For example, the values for $V_L/V_2$ for various line lengths can be stored in a look-up table in computer-readable medium (e.g., EEPROM or flash memory) accessible by a processor (e.g., processor 206). The range of values for loop length can be selected to cover the range of interest, for example, the range necessary for xDSL loop qualification (e.g., 1 Kft to 20 Kft). The step size of loop length L will determine the size of the look-up table. To reduce the size of the look-up table, a larger step size can be used in conjunction with real-time interpolation to get finer step size values. In any event, the step size can be judiciously selected to provide the desired resolution with the accuracy range of the measurements. The look-up table need not be resident in the modem 200, but can reside, for example, in a database in the CO and accessible to the modem 200 during SELP mode.

In one embodiment of the present invention, the ratio of the magnitude of transfer function $V_L/V_2$ can be used to determine whether there is a short in the line. If the ratio absolute value of the ratio $V_L/V_2$ is less than a predetermined threshold value, then there is a short in the line.

In one embodiment of the present invention, load coils can be identified in the line by examining the transfer function $V_L/V_2$ over a range of frequencies (e.g., DC to about 5 KHz). The load coils are typically series inductors (e.g., 88 mH) placed across 6 Kft intervals along a transmission line, for providing a flatter frequency response across the voice band. Since DSL service typically cannot be deployed on lines having load coils, identifying the presence of load coils is a desired step in qualifying a transmission line for DSL service. Generally, the number of peaks detected in the transfer function $V_L/V_2$ over the frequency range of interest is equal to the number of load coils in the transmission line. A similar technique is described in detail in co-pending patent application Ser. No. 09/853,048, entitled "SINGLE ENDED LINE PROBING IN DSL SYSTEM." Those with ordinary skill in the art would understand how to adapt those techniques to identify load coils in the line by examining the transfer function $V_L/V_2$ over the operating range of the hybrid circuit 400.

After the estimated line length is determined 1218, the SELP mode exits 1220 and the estimated line length can be stored in local memory or other storage device (local or external), for retrieval and/or further processing. In DSL systems, the estimated line length can be provided to a network operator to assist in determining whether DSL-based service can be provided on that particular line (e.g., subscriber loop).

The above description is included to illustrate the operation of the preferred embodiments and is not meant to limit the scope of the invention. Rather, the scope of the invention is to be limited only by the claims. From the above discussion, many variations will be apparent to one skilled in the relevant art that would yet be encompassed by the spirit and scope of the invention.

What is claimed is:

1. A method of estimating the length of a transmission medium included in a communication system having a transformerless hybrid circuit, comprising:
    transmitting a probe signal over the transmission medium by way of the transformerless hybrid circuit;
    measuring a reflected version of the probe signal received from the transmission medium;
    determining a transfer function characterizing the transmission medium and the transformerless hybrid circuit based on the transmitted probe signal and the reflected version of the probe signal; and
    estimating the length of the transmission medium based on the transfer function.

2. The method of claim 1, wherein the transfer function is determined from the ratio of a closed loop voltage measured at the output of the transformerless hybrid circuit when the transformerless hybrid circuit is coupled to the transmission medium to an open loop voltage measured at the output of the transformerless hybrid circuit when the transformerless hybrid is decoupled from the transmission medium.

3. The method of claim 2, wherein the open loop voltage is determined by disconnecting the transformerless hybrid circuit from transmission medium and measuring the open loop voltage at the output of the transformerless hybrid circuit.

4. The method of claim 2, wherein the open loop voltage is precomputed and retrievable from memory.

5. The method of claim 2, wherein the ratio of the closed loop voltage to the open loop voltage is used to access a data structure containing estimated line lengths.

6. The method of claim 1, wherein the transmission medium is a Digital Subscriber Line (DSL) loop.

7. The method of claim 1, wherein the estimated length of the transmission medium is determined from a theoretical relationship between the transfer function and the length of the transmission medium.

8. The method of claim 1, wherein a plurality of transfer functions are determined over a frequency range thereby providing a plurality of measured values that are compared against known values to determine the characteristics of the transmission medium.

9. A system for estimating the length of a transmission medium included in a communication system having a transformerless hybrid circuit, comprising:
    a transformerless hybrid circuit for transmitting a probe signal over the transmission medium; and
    a processor operatively coupled to the transformerless hybrid circuit for determining a transfer function characterizing the transmission medium and the transformerless hybrid circuit based on the transmitted probe signal and a reflected version of the probe signal received from the transmission medium, and for estimating the length of the transmission medium based on the transfer function.

10. The system of claim 9, wherein the system is a Digital Subscriber Line (DSL) modem and the transmission medium is a DSL loop.

11. The system of claim 9, wherein the transfer function is determined from the ratio of an open loop voltage measured at the output of the transformerless hybrid circuit to a closed loop voltage measured at the output of the transformerless hybrid circuit.

12. The system of claim 9, wherein the estimated length of the transmission medium is determined from a theoretical relationship between the transfer function and the length of the transmission medium.

13. The system of claim 9, wherein a plurality of transfer functions are determined over a frequency range thereby providing a plurality of measured values that are compared against known values to determine the characteristics of the transmission medium.

14. The system of claim 9, wherein the transformerless hybrid circuit is configurable to allow the probe signals access to the transmission medium.

15. The system of claim 9, further including a splitter operatively coupled between the transformerless hybrid circuit and the transmission medium, the splitter capable of being reconfigured to allow the probe signals access to the transmission medium.

16. A computer-readable medium having stored thereon instructions which, when executed by a processor, cause the processor to perform the steps of:
    measuring a reflected version of a transmitted probe signal received from the transmission medium;
    determining a transfer function characterizing the transmission medium and the transformerless hybrid circuit based on the transmitted probe signal and the reflected version of the probe signal; and
    estimating the length of the transmission medium based on the transfer function.

17. The computer-readable medium of claim 16, wherein the transmission medium is a Digital Subscriber Line (DSL) loop.

18. The computer-readable medium of claim 16, wherein the estimated length of the transmission medium is determined from a theoretical relationship between the transfer function and the length of the transmission medium.

19. The computer-readable medium of claim 16, wherein a plurality of transfer functions are determined over a frequency range thereby providing a plurality of measured values that are compared against known values to determine the characteristics of the transmission medium.

20. The computer-readable medium of claim 16, wherein the open loop voltage is determined by disconnecting the transformerless hybrid circuit from transmission medium and measuring the open loop voltage at the output of the transformerless hybrid circuit.

21. The computer-readable medium of claim 16, wherein the transfer function is determined from the ratio of a closed loop voltage measured at the output of the transformerless hybrid circuit when the transformerless hybrid circuit is coupled to the transmission medium to an open loop voltage measured at the output of the transformerless hybrid circuit when the transformerless hybrid is decoupled from the transmission medium.

22. The computer-readable medium of claim 17, wherein the open loop voltage is precomputed and retrievable from memory.

23. The computer-readable medium of claim 17, wherein the ratio of the closed loop voltage to the open loop voltage is used to access a data structure containing estimated line lengths.

24. A Digital Subscriber Line (DSL) modem, comprising:
transformerless hybrid circuit means for transmitting a probe signal over the transmission medium; and
processing means operatively coupled to the transformerless hybrid circuit means for determining a transfer function characterizing the transmission medium and the transformerless hybrid circuit means based on the transmitted probe signal and a reflected version of the probe signal received from the transmission medium, and for estimating the length of the transmission medium based on the transfer function.

* * * * *